(12) United States Patent
Wesneski et al.

(10) Patent No.: US 12,505,260 B2
(45) Date of Patent: Dec. 23, 2025

(54) TIMESTAMPING TAMPERING EVENTS THAT OCCUR DURING PRIMARY POWER OUTAGES

(71) Applicant: HEWLETT PACKARD ENTERPRISE DEVELOPMENT LP, Spring, TX (US)

(72) Inventors: Christopher M. Wesneski, The Colony, TX (US); Theodore F. Emerson, Spring, TX (US)

(73) Assignee: Hewlett Packard Enterprise Development LP, Spring, TX (US)

(*) Notice: Subject to any disclaimer, the term of this patent is extended or adjusted under 35 U.S.C. 154(b) by 171 days.

(21) Appl. No.: 18/452,608

(22) Filed: Aug. 21, 2023

(65) Prior Publication Data

US 2024/0111912 A1 Apr. 4, 2024

Related U.S. Application Data

(60) Provisional application No. 63/412,099, filed on Sep. 30, 2022.

(51) Int. Cl.
*G06F 21/86* (2013.01)
*G06F 1/14* (2006.01)

(52) U.S. Cl.
CPC ............... *G06F 21/86* (2013.01); *G06F 1/14* (2013.01)

(58) Field of Classification Search
CPC . G06F 21/86; G06F 21/87; G06F 1/14; G06F 1/30; G06F 1/3203; G06F 1/28
See application file for complete search history.

(56) References Cited

U.S. PATENT DOCUMENTS

| 6,647,400 | B1 | 11/2003 | Moran |
| 6,826,697 | B1 | 11/2004 | Moran |
| 6,996,843 | B1 | 2/2006 | Moran |
| 7,024,700 | B1 * | 4/2006 | Horikoshi ............... G06F 21/88 726/36 |

(Continued)

FOREIGN PATENT DOCUMENTS

| WO | WO2007128166 | 11/2007 |
| WO | WO2021258391 | 12/2021 |

*Primary Examiner* — Hosuk Song
(74) *Attorney, Agent, or Firm* — Trop, Pruner & Hu, P.C.

(57) ABSTRACT

A process includes performing actions responsive to secondary power when primary power for a computer platform is unavailable. The actions include providing, by a timer of a computer platform, a timer output that is associated with a first time domain and corresponds to an accumulated time that primary power is unavailable. Moreover, these actions include using secondary power to detect tampering with the computer platform, and responsive to detecting the tampering, reading the timer output to provide a first timestamp that represents a time of detection of the tampering. The process further includes actions which are performed responsive to primary power being subsequently available. These actions include reading data from a non-volatile storage of the computer platform. The data represents a snapshot of a real time clock (RTC) device time that is provided by an RTC device that is powered by the primary power and corresponds to a second time domain. The actions further include transforming the first timestamp into a second timestamp associated with the second time domain based on the snapshot.

20 Claims, 8 Drawing Sheets

(56) References Cited

U.S. PATENT DOCUMENTS

| | | |
|---|---|---|
| 7,032,114 B1 | 4/2006 | Moran |
| 7,058,968 B2 | 6/2006 | Rowland et al. |
| 7,065,656 B2 * | 6/2006 | Schwenck ............... G06F 21/87 |
| | | 726/34 |
| 7,065,657 B1 | 6/2006 | Moran |
| 7,085,936 B1 | 8/2006 | Moran |
| 7,296,299 B2 * | 11/2007 | Schwenck ............ H05K 5/0208 |
| | | 174/521 |
| 7,882,383 B2 | 2/2011 | May et al. |
| 8,578,490 B2 | 11/2013 | Moran |
| 8,756,687 B1 * | 6/2014 | Klein .................... G06F 3/0686 |
| | | 726/22 |
| 9,465,771 B2 | 10/2016 | Davis et al. |
| 9,471,121 B2 | 10/2016 | Saha et al. |
| 9,594,414 B2 | 3/2017 | Lambert et al. |
| 10,152,599 B2 | 12/2018 | Hildebrand |
| 10,509,435 B2 | 12/2019 | Krithivas et al. |
| 10,620,241 B2 | 4/2020 | Pietrowicz et al. |
| 10,754,414 B2 | 8/2020 | Hanson et al. |
| 12,142,943 B2 * | 11/2024 | Shichino ................. H02J 50/80 |
| 2003/0097557 A1 | 5/2003 | Tarquini |
| 2009/0055157 A1 | 2/2009 | Soffer |
| 2016/0162710 A1 * | 6/2016 | Chen .................... H04W 12/06 |
| | | 726/34 |
| 2023/0117486 A1 * | 4/2023 | Rokhsaz ............. G06F 11/3476 |
| | | 726/34 |

* cited by examiner

TIMESTAMPING TAMPERING EVENTS THAT OCCUR DURING PRIMARY POWER OUTAGES

BACKGROUND

A computer platform may be subject to a security attack for such purposes as seeking access to information that is stored on the computer platform or harming components of the computer platform. To prevent or at least inhibit the degree of potential harm inflicted by security attacks, the computer platform may have different levels of security protection. For example, the computer platform may have various mechanisms to limit access, such as firewalls, passwords and keys. As another example, the computer platform may have a security processor. The security processor may provide a number of security-related functions, such as functions pertaining to securely storing platform secrets; validating firmware; securing firmware updates; generating cryptographic keys; sealing and unsealing cryptographic keys; and other measures to harden the computer platform against security attacks. As another example, a computer platform may have sensors and associated circuits to detect physical tampering with the computer platform.

DETAILED DESCRIPTION

Figure 1:
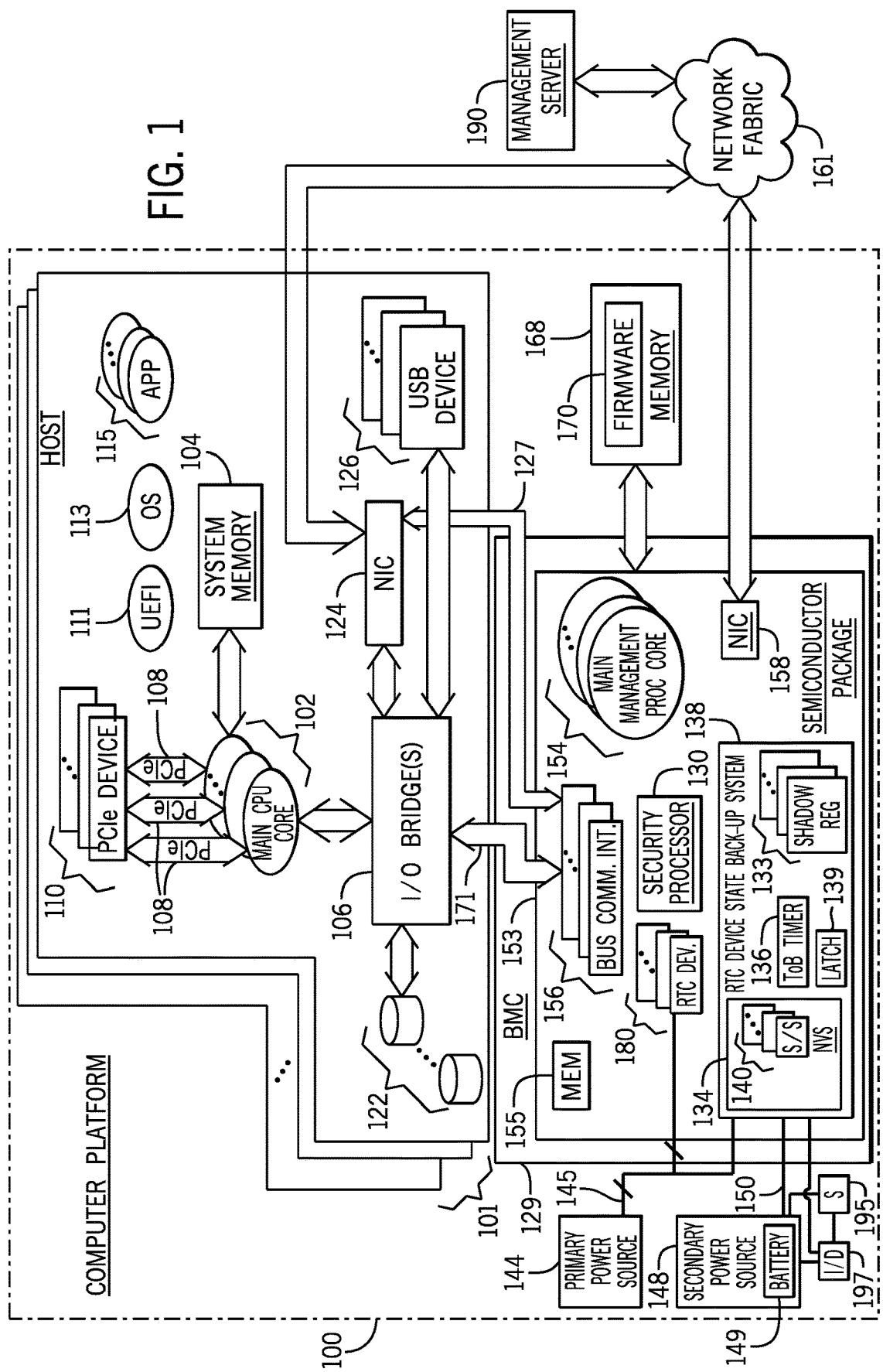
FIG. 1 is a block diagram of a computer platform that has a real time clock (RTC) device state back-up system that, when primary power is unavailable, logs a detected tampering event with a time-on-battery timestamp and when primary power is subsequently available, transforms the time-on-battery timestamp to a timestamp that corresponds to an RTC device time domain, according to an example implementation.

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing particular examples only and is not intended to be limiting. As used herein, the singular forms "a," "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as connected, whether directly without any intervening elements or indirectly with at least one intervening elements, unless otherwise indicated. Two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As modern hardware root-of-trust technologies make it ever-increasingly difficult for attackers to gain access to computer platforms, nefarious individuals may seek to compromise computer platforms through physical tampering. The physical tampering may occur after the computer platform is deployed in service, or the physical tampering may occur after the computer platform is manufactured but before the computer platform is deployed in service. As examples, physical tampering activities may include opening or removing a protective cover of the computer platform, removing the computer platform from a rack, or other physical actions to gain access or at least attempt to gain access to the computer platform. It may be beneficial to know the physical tampering history of a computer platform for a variety of reasons, such as for purposes of determining whether the computer platform is to be trusted, determining whether forensic analyses should be performed on the computer platform, determining whether remedial actions should be undertaken, determining when physical tampering occurred and determining whether the computer platform should be used.

A computer platform may have circuitry to detect and log physical tampering events, and this circuitry may rely on main, or primary, power being available or at least a capacitive charge-based residual primary power being available for a short time after primary power is removed. A potential challenge with relying on primary power-based detection and logging of physical tampering activity is that the tampering may occur after primary power (or any capacitive-based power residual derived therefrom) is no longer available, and as such, there may be no record of the tampering.

A log entry, or record, for a tampering event (also referred to as an "intrusion detection event" or a "tampering detection event" herein) may include data describing the type of tampering and data representing a timestamp. In this context, a "timestamp" refers to a time that is assigned to the tampering event (e.g., a time that the tampering event was detected). The timestamp may include, for example, a time-of-day (e.g., a time in terms of an hour, minute and second) and a calendar date (e.g., a date in terms of a day of the week, a day of the month, a month and a year), which are provided by a real time clock (RTC) device of the computer platform. In the context used herein, a calendar date and a time-of-day are example components of an "RTC device time." An intrusion may be detected while the computer platform is being powered by primary power, and in this case, the current RTC time is used as the timestamp. An intrusion may also be detected when primary power is unavailable.

One approach to detect and log tampering events when primary power is not available is to equip the computer platform with an alternate, stored energy source (e.g., a battery) to power the computer platform's intrusion detection system during primary power outages. For example, the stored energy source may power such components of an intrusion detection and logging system as a microprocessor, a non-volatile memory, an RTC device, and sensor. In response to the sensor sensing a tampering event, the microprocessor may read the output of the RTC device and generate a timestamp for the event. The microprocessor may further store data representing a record of the tampering detection in the non-volatile memory device. Such an approach, however, may have a significant power footprint and associated cost.

In accordance with example implementations that are described herein, a computer platform detects and logs tampering events that occur when primary power is unavailable in a cost-effective and power-efficient manner. In accordance with example implementations, a computer platform includes components that are powered by an alternate, or secondary power source, to detect and log tampering events. In accordance with example implementations, these components do not include a microprocessor or traditional RTC circuitry.

More specifically, in accordance with some implementations, the computer platform includes a latch and a time-on-battery (ToB) timer that are powered by secondary power (e.g., power derived from a stored energy source, such as a battery). The ToB timer measures a time (called a "ToB time" herein) that corresponds to the total, or accumulated, time that the computer platform has been on secondary power (i.e., the total, or accumulated, time that primary power has been removed). In response to a latch trigger signal that indicates the detection of a physical tampering event, the latch captures the output of the ToB timer (e.g., stores data, which represents the current value of the ToB timer) to form a first timestamp that represents, in the time domain of the ToB timer, a time that corresponds to the tampering event. Stated differently, the first timestamp represents a time corresponding to detection of a tampering event referenced from a time when the primary power became unavailable.

When the computer platform is subsequently fully powered up and receives primary power, the computer platform converts, or transforms, the first timestamp (which is stored by the latch and is associated with the ToB time domain) to a second timestamp. The second timestamp represents a time of the tampering detection event, in the time domain of the computer platform's RTC device. In accordance with example implementations, the "time" represented by the second timestamp may include a time-of-day (e.g., hour, minute and second) as well as a calendar date (e.g., day of week, day of month, month, and year) of the tampering detection event. In accordance with example implementations, for purposes of transforming the first timestamp to the second timestamp, the computer platform includes an restore controller. The restore controller, in accordance with example implementations, responds when primary power is once again available to retrieve a snapshot of the RTC device's time taken near or at the time that primary power was removed. The restore controller adjusts the time represented by the snapshot based on the first timestamp to derive the second timestamp.

For example, if the first timestamp is 24 seconds and the snapshot corresponds to Monday, Mar. 12, 2018, 08:14:25 (e.g., a time corresponding to a 24 hour format), then the second timestamp corresponds to Monday, Mar. 12, 2018, 8:14:49. In accordance with example implementations, the computer platform includes an update controller that stores a current snapshot of a time indication (e.g., a time-of-day and calendar date) that is provided by the RTC device in a non-volatile storage, so that the snapshot tracks the RTC device's time indication. Therefore, when primary power available, the most recently-stored snapshot represents the current RTC time, and when a primary power outage occurs, the snapshot represents the recorded RTC time before the primary power outage began. The restore controller, in accordance with example implementations, transforms the first timestamp (which is stored by the latch and is associated with the ToB domain) to the second timestamp (which is associated with the RTC device time domain) by using the latched ToB to adjust (e.g., add to) the time-of-day that is represented by data of the snapshot.

The primary power for the computer platform is provided by a primary power source, which may, for example, in accordance with some implementations, include a power supply that receives an AC voltage and converts the AC voltage into one or multiple DC voltages. The DC voltage(s) may be routed to respective supply voltage rail(s) of the computer platform. The primary power source may be partially or wholly contained in the computer platform, or the primary power source may be separate from, or external to, the computer platform, depending on the particular implementation. For example, in accordance with an example implementation, the computer platform may be a blade server, and the primary power source may include a power distribution unit (PDU) for a rack in which the blade server is installed. The secondary power may be provided by a secondary stored energy source, such as a coin cell battery, a rechargeable battery, a supercapacitor, or another stored energy source.

As examples, a primary power outage may occur when a computer platform is controllably powered down, when the delivery of power from a primary power source is unexpectedly interrupted, when the computer platform is disconnected from a backplane connector, or because of another reason. In the context used herein, a primary power outage begins when a corresponding primary power source is disabled and ends when the primary power source is subsequently re-enabled. A "disabled" primary power source refers to power (called "primary power herein") from the primary power source being unavailable, either due to the primary power source being directly shut down or disabled, as well as primary power being unavailable due to the primary power source being disconnected or the delivery of the primary power from the primary power source otherwise being interrupted. An "enabled" primary power source refers to the primary power from the primary power source being available to the power consuming components of the computer platform. A given primary power outage may be confined within a single calendar day or may span multiple calendar days.

In accordance with example implementations, the latch, ToB timer, non-volatile storage, update controller and restore controller are part of a subsystem of the computer platform called the "RTC device state back-up system." In accordance with example implementations, in addition to transforming timestamps that are logged during primary power outages to the time domain of an RTC device and maintaining a current snapshot of the RTC device time in non-volatile storage, the RTC state back-up system also restores the state of the RTC device when a primary power outage ends. In this manner, the RTC device may have a volatile state, which may be corrupted or destroyed, if all power to the RTC device is removed. In this context, an RTC device's "state" generally refers to a set of data stored in the RTC device. The state may include, for example, data that is stored in registers of the RTC device, such as data representing a time-of-day, data representing a calendar date, data representing an alarm time, data representing a format for the time-of-day, data representing a configuration parameter for the RTC device, data representing a configuration of a computer platform, or other register data. The state may include data that is stored in a volatile memory of the RTC device, such as data representing configuration data (e.g., basic input/output system (BIOS) configuration parameters) for the computer platform.

In general, when primary power is available, the update controller of the RTC device state back-up system maintains and updates one or multiple non-volatile snapshots (also called "state snapshots" herein) that represent the most recent state of the RTC device. The snapshots are stored in a non-volatile storage of the RTC device state back-up system. In this context, a "non-volatile storage" refers to a memory having a content that survives a loss of primary power. As an example, in accordance with some implementations, the RTC device state back-up system has a non-volatile storage that is formed from the combination of a volatile memory that receives the secondary power. As another example, in accordance with further implementations, the RTC device state back-up system may include a non-volatile storage formed from a truly non-volatile memory, such as a memory formed from flash memory devices, memristor memory devices, phase change memory devices, or other memory devices that store content when power is removed from the memory devices.

The updates of the snapshots cease when primary power is not available. When a primary power outage ends, in accordance with example implementations, the restore controller of the RTC device state back-up system restores the state of the RTC device based on the snapshots and the ToB; and if tampering was detected during the primary power outage, the restore controller transforms the timestamp that is stored by the latch to a timestamp that corresponds to the time domain of the RTC device.

FIG. 1 depicts a computer platform 100 in accordance with example implementations. Referring to FIG. 1, the computer platform 100, in accordance with example implementations, is a modular unit, which includes a frame, or chassis. Moreover, this modular unit may include hardware that is mounted to the chassis and is capable of executing machine-readable instructions. A blade server is an example of the computer platform 100, in accordance with some implementations.

The computer platform 100 may have any of a number of different other forms, in accordance with further implementations. As examples, the computer platform 100 may be a server other than a blade server, such as a rack-mounted server or a standalone server. As other examples, the computer platform 100 may be a client, a thin client, a desktop computer, a tablet computer, a portable computer or a wearable computer. As other examples, the computer platform 100 may be a networking device, such as a network switch or a gateway. As another example, the computer platform 100 may be a storage device, such as a storage array. As other examples, the computer platform 100 may be a portable electronic device, a portable computer, a tablet computer, a thin client or a laptop computer. As other examples, the computer platform 100 may be a television, a modular switch, a consumer electronics device, an appliance, an edge processing system, a sensor system, a watch, a removable peripheral card, or, in general, any other processor-based device.

In accordance with example implementations, the computer platform 100 may be connected to a network fabric 161. The network fabric 161 may be associated with one or multiple types of communication networks, such as (as examples) Fibre Channel networks, Compute Express Link (CXL) fabric, dedicated management networks, local area networks (LANs), wide area networks (WANs), global networks (e.g., the Internet), wireless networks, or any combination thereof.

The computer platform 100 may, in accordance with some implementations, include multiple hardware RTC devices 180 that are individually associated with respective hosts 101 of the computer platform 100 (e.g., each RTC device 180 may be associated with a different host 101). In this context, a "hardware" RTC device refers to an actual, or physical, component (e.g., a component containing logic gates, a register and a memory), which provides one or multiple functions, or services, related to measuring a time that corresponds to the rotational cycles of the Earth. As an example of such a service, an RTC device 180 may provide data representing one or multiple values (e.g., one or multiple register values) that collectively represent an RTC device time.

The RTC device time may include, as an example, a time-of-day (also called a "time" herein) in terms of a number of seconds, a number of minutes and a particular hour. As another example, the RTC device time may include a calendar date (also called a "date" herein) in terms of a day of the week, a day of the month, a month and a year (e.g., a two digit representation for the year that omits the century or a four digit representation that includes the century). The RTC device 180 may provide or store data that represents information other than a time. As another example, an RTC device 180 may provide one or multiple alarm timers that are triggered by programmed alarm times that correspond to particular times-of-day set points. An RTC device 180 may further provide one or multiple functions, or services, which are not related to measuring a time that corresponds to the rotational cycles of the Earth. For example, in accordance with some implementations, an RTC device 180 may have a volatile memory that stores data (e.g., configuration data) for the computer platform 100.

In accordance with example implementations, each RTC device 180 may be viewed as providing an "RTC instance." In this context, an "RTC instance" refers to a logical or physical instance that is associated with measuring time (e.g., measuring at least one of a time of day, a day of the week, a day of the month, a year or a century). In an example, an RTC instance may be a logical instance that corresponds to a host 101, and the RTC instance may measure time for the host 101. In another example, an RTC instance may be a physical instance that measures time for a particular non-abstracted (or "physical"), hardware component of the computer platform 100, such as a baseboard management controller (BMC) 129.

In accordance with further implementations, the computer platform 100 may have a single RTC device. In this manner, the single RTC device may be associated with management resources of the computer platform 100 for a variety of different reasons, which include providing time-of-day and calendar indications for the timestamping of events (e.g., tampering detection events and other events) that occur with the computer platform 100.

In accordance with example implementations, the RTC devices 180 may be fabricated on one or multiple semiconductor die that are contained within one or multiple semiconductor packages (or "chips"). The semiconductor package may be any of a number of different semiconductor packages, such as a surface mount package, a through-hole package, a ball-grid array package, a small outline package, a chip-scale package, or any other container containing one or multiple semiconductor die.

For the example implementation that is depicted in FIG. 1, the RTC devices 180 are part of a semiconductor package 153. In this manner, the RTC devices 180 may be fabricated on one or multiple die of the semiconductor package 153, depending on the particular implementation. Moreover, as further depicted in FIG. 1, in accordance with example implementations, the semiconductor package 153 may be part of a management controller of the computer platform 100, such as the BMC 129.

In the context used herein, a "BMC," or "baseboard management controller," is a specialized service processor that monitors the physical state of a server or other hardware using sensors and communicates with a management system through a management network. The baseboard management controller may also communicate with applications running on one or multiple host instances through an input/output controller (IOCTL) interface driver, a representational state transfer (REST) application program interface (API), or some other system software proxy that facilitates communication between the baseboard management controller and applications. The baseboard management controller may have hardware level access to hardware devices that are located in a server chassis including system memory. The baseboard management controller may be able to directly modify the hardware devices. The baseboard management controller may operate independently of the operating system of the system in which the baseboard management controller is disposed. A baseboard management controller may be located on the motherboard or main circuit board of the server or other device to be monitored.

The fact that a baseboard management controller is mounted on a motherboard of the managed server/hardware or otherwise connected or attached to the managed server/hardware does not prevent the baseboard management controller from being considered "separate" from the server/hardware. As used herein, a baseboard management controller has management capabilities for sub-systems of a computing device, and is separate from a processing resource that executes an operating system of a computing device. The baseboard management controller is separate from a processor, such as a central processing unit, which executes a high-level operating system or hypervisor on a system.

In accordance with further implementations, the RTC devices 180 may not be part of a BMC, and in accordance with further implementations, the RTC device 180 may not be part of a management controller. For example, in accordance with further implementations, the RTC devices 180 may be individual, standalone semiconductor packages. In accordance with further implementations, the RTC devices 180 may be part of an I/O bridge 106 or other hardware component of the computer platform 100.

In accordance with example implementations, components of the computer platform 100 receive power (called "primary power" herein) from a primary power source 144. As an example, the primary power source 144 may include a power supply that receives input power directly from or derived from an alternating current (AC) source (e.g., an AC source whose power is communicated via an AC wall) and provides power to one or multiple primary power supply lines 145 (e.g., supply voltage rails of the computer platform 100) when the AC power is available.

Depending on the particular implementations, the primary power source 144 may be part of the computer platform 100 (as depicted in FIG. 1) or may be separate from the computer platform 100. For example, in accordance with some implementations, the computer platform 100 may be a blade server, and the primary power source 144 may include a power distribution unit (PDU) for a rack that contains the blade server. The primary power source 144 may, in accordance with further implementations, includes components of the computer platform 100 and components that are not part of the computer platform 100. As depicted in FIG. 1, in accordance with example implementations, the RTC devices 180 may be coupled to one or multiple primary supply lines 145 for purposes of receiving primary power, when available.

An RTC device state back-up system 138 of the computer platform 100, in accordance with example implementations, maintains non-volatile snapshots 140 (also called "state snapshots" herein) of states of the RTC devices 180 so that, if a primary power outage occurs, the RTC device state back-up system 138 uses the snapshots 140 to restore the states when the primary power outage ends. A given state (e.g., a time-of-day and/or a calendar date) of an RTC device 180 may be time-based, and the RTC device state back-up system 138 may use the corresponding snapshot 140 of the given state, in conjunction with a ToB (provided by a ToB timer 136), to restore the given state when the primary power outage ends. Other states (e.g., volatile memory contents) of the RTC devices 180 may not be time-based, and the RTC back-up system 138 may restore these states from the corresponding snapshots 140.

As depicted in FIG. 1, in accordance with example implementations, the RTC device state back-up system 138 includes a non-volatile storage 134 that stores data representing the snapshots 140. In accordance with example implementations, certain components of the RTC device state back-up system 138, such as the non-volatile storage 134, an address decoder, shadow registers 133, and the ToB timer 136, may receive alternate power (called "secondary power" herein) from a secondary power source 148. The non-volatile storage 134 survives a loss of power from the primary power source 144. The non-volatile storage 134 may or may not be formed from non-volatile memory devices, depending on the particular implementation. In an example, the non-volatile storage 134 may include volatile memory devices that are powered by secondary power, and therefore, the volatile memory devices retain their stored data when a primary power loss occurs, as long as the secondary power is uninterrupted. In another example, the non-volatile storage 134 may include non-volatile memory devices (e.g., flash memory devices, ROM devices, phase change memory devices, memristor memory devices, or memory devices corresponding to another non-volatile memory device technology).

The secondary power source 148, in accordance with example implementations, contains a stored back-up energy source, such as a battery 149, which directly or indirectly provides the secondary power. In this manner, as depicted in FIG. 1, in accordance with example implementations, the secondary power source 148 may provide power to one or multiple secondary power supply lines 150 (secondary power voltage rails of the computer platform 100), which are coupled to components of the RTC back-up system 138. In accordance with some implementations, the secondary power source 148 may include a DC-to-DC converter, as well as power conditioning components. The battery 149 may be, as examples, a rechargeable battery, such as a lithium-ion battery, or a non-rechargeable battery, such as a coin cell battery. In accordance with further implementations, a non-battery-based stored energy source may be used in place of the battery 149, such as, for example, a supercapacitor.

For implementations in which the stored energy source is rechargeable (e.g., the stored energy source is a supercapacitor or rechargeable battery), the secondary power source 148 may use primary power that is derived from the primary power source 144 to charge the stored energy source when the primary power is available. Regardless of the particular stored energy source that is used to provide secondary power, in accordance with example implementations, due to the space and cost efficiencies provided by the RTC device state back-up system 138, the stored energy source is sized for a single RTC device 180, although the stored energy source may, in accordance with example implementations, provide secondary power that is used to back-up multiple RTC devices 180.

The RTC device time indications (e.g., the time-of-day indications) that are provided by the RTC devices 180 may, at any particular moment, differ, and in general, these indications may be independent of one another. These differences may be attributable to different hosts 101 (which operate independently of one another in different respective time domains) asynchronously (with respect to one another) initializing the times of the respective RTC devices 180. For example, the different hosts 101 may be providing services to different respective geographical locations, and consequently, at least some of the hosts 101 may be operating in different time zones. Moreover, the time format (e.g., a binary coded decimal format, a twenty-four hour time-of-day format or other format) for one RTC device 180 may be different than the time format for another RTC device 180. As described further herein, in accordance with example implementations, the RTC device state back-up system 138 maintains the snapshots 140 for the associated RTC devices 180 in a manner that accommodates the differences in the time indications (e.g., the differences in time and format) that are provided by the RTC devices 180. Moreover, the RTC device state back-up system 138, in accordance with example implementations, keeps track of the different time formats so that the restoration of the RTC devices 180 after a power outage preserves the time formats.

For the example implementation that is depicted in FIG. 1, the RTC device state back-up system 138 is part of the BMC 129. In accordance with some implementations, components of the RTC back-up system 138 may be part of the semiconductor package 153 that contains the RTC devices 180. In accordance with some implementations, components of the RTC device state back-up system 138 may be fabricated on the same semiconductor die of the semiconductor package 153 as components of the RTC devices 180. As another example, in accordance with some implementations, components of the RTC device state back-up system 138 may be fabricated on different semiconductor die of the semiconductor package 153. In accordance with further implementations, components of the RTC device state back-up system 138 may be part of a semiconductor package of the BMC 129 other than the semiconductor package 153. Moreover, in accordance with further implementations, components of the RTC device state back-up system 138 may be part of a standalone semiconductor package, which is not part of the BMC 129. In accordance with further implementations, components of this standalone semiconductor package may also include the RTC devices 180 or components of the RTC devices 180.

In accordance with example implementations, the BMC 129 may execute a set of firmware instructions, called a "firmware management stack," for purposes of providing a variety of management services for the hosts 101 of the computer platform 100 as part of the BMC's management plane. In accordance with example implementations, the BMC 129 may independently provide management services for each host 101.

As examples, the BMC 129 may provide such management services as monitoring sensors; monitoring operating system status; monitoring power statuses; logging computer system events; providing a remote console; providing remotely-controlled functions and other virtual presence technologies; and other management activities. In accordance with example implementations, the BMC 129 may communicate with a remote management server 190 (e.g., a server that may or may not be located in the same datacenter as the computer platform 100 or a server that is located at a different geographical location than the computer platform 100) via a network interface controller (NIC) 158 of the BMC 129. In accordance with further implementations, the BMC 129 may communicate with the remote management server 190 via a NIC 124 through a sideband bus 127 (e.g., a bus corresponding to a Network Controller Sideband Interface (NC-SI) electrical interface and protocol defined by the Distributed Management Task Force (DMTF)) that is connected to a bus communication interface 156 of the BMC 129.

The management services that are provided by the BMC 129 may include remotely-management functions, i.e., functions that may be managed by the remote management server 190. As examples, the remotely-managed functions may include keyboard video mouse (KVM) functions; virtual power functions (e.g., remotely activated functions to remotely set a power state, such as a power conservation state, a power on, a reset state or a power off state); virtual media management functions; and one or multiple other management-related functions for a given host 101.

In accordance with example implementations, the BMC 129 includes one or multiple main management processing cores 154 (called "main processing cores 154" herein), such as central processing unit (CPU) cores, that execute machine-readable instructions to provide management services for the hosts 101. These instructions may correspond to a firmware management stack of the BMC 129. In accordance with some implementations, the main processing cores 154 may execute machine-readable instructions that are validated and loaded into a main memory 159 (e.g., a memory outside of the semiconductor package 153) of the BMC 129 by a security processor 130 of the BMC 129.

The security processor 130, in accordance with example implementations, provides security services that are part of the BMC's security plane, which is isolated from the BMC's management plane. In general, the security processor 130 provides cryptographic services and protects the computer platform 100 and host(s) 101 against security attacks. As examples, the security services may validate at least an initial portion of firmware 170 that is stored in a non-volatile memory 168 of the computer platform 100 and loaded into a memory 155 of the BMC 129. More specifically, in accordance with some implementations, the BMC 129 may include a silicon Root-of-Trust (SRoT), and the security processor 130 may extend a chain of trust from the SRoT to the firmware management stack that is executed by the BMC's main management processing cores 154. The security processor 130 may perform various other security services for the computer platform 100 and hosts 101. As examples of security services, the security processor 130 may detect tampering; generate random or pseudo random numbers; store measurement digests; sign measurement digests; store measurement hashes; load reference measurement hashes; store cryptographic keys, retrieve cryptographic keys, generate cryptographic keys, validate firmware image; retrieve a cryptographic platform identity, create certificates, store certificates, add certificates, delete certificates, seal cryptographic keys, unseal cryptographic keys and provide other security-related services.

In the context used herein, a "host" (or "host instance") refers to a logical instance of a computing platform (e.g., computer platform 100), and the logical instance includes one or multiple processors (e.g., one or multiple CPU cores), memory and one or multiple peripherals (e.g., one or multiple RTC devices 180). The host (or "host instance") may execute one or multiple operating system 113 instances (e.g., a Linux or Windows operating system instance), and may be associated with a virtualization technology (e.g., a hypervisor). For the example implementation that is depicted in FIG. 1, the resources for a host 101 may include one or multiple main CPU cores 102 (e.g., the CPU cores of a particular CPU package, or socket) and memory devices that are connected to the CPU core(s) 102 to form a system memory 104. As another example, the resources for the host 101 may include one or multiple graphics processing units (GPUs). The CPU core(s) 102 may be coupled to one or multiple input/output (I/O) bridges 106, which allow communications between the CPU core(s) 102 and the BMC 129, as well as communications with various I/O devices, such as storage drives 122; one or multiple network interface controllers (NICs) 124; one or multiple Universal Serial Bus (USB) devices 126; I/O devices; a video controller; and so forth. Moreover, as also depicted in FIG. 1, the computer platform 100 may include one or multiple Peripheral Component Interconnect Express (PCIe) devices 110 (e.g., PCIe expansion cards) that may be coupled to the CPU core(s) 102 through corresponding individual PCIe bus(es) 108. In accordance with a further example implementation, the PCIe device(s) 110 may be coupled to the I/O bridge(s) 106, instead of being coupled to the CPU core(s) 102. In accordance with yet further implementations, the I/O bridge(s) 106 and PCIe interfaces may be part of the CPU core(s) 102. In accordance with example implementations, the host 101 may include CXL fabric to couple the CPU core(s) 102 to high speed coherent and non-coherent peripherals.

In general, the memory devices that form the system memory 104, as well as other memories and storage media that are described herein, may be formed from non-transitory memory devices, such as semiconductor storage devices, flash memory devices, memristors, phase change memory devices, a combination of one or more of the foregoing storage technologies, and so forth. Moreover, the memory devices may be volatile memory devices (e.g., dynamic random access memory (DRAM) devices, static random access (SRAM) devices, and so forth) or non-volatile memory devices (e.g., flash memory devices, read only memory (ROM) devices and so forth), unless otherwise stated herein.

In accordance with some implementations, one or multiple NICs 124 of the computer platform 100 may be intelligent input/output peripherals, or "smart I/O peripherals," which may provide backend I/O services for one or multiple applications 115 (or application instances) that execute on the computer platform 100. In accordance with some implementations, one or multiple of the PCIe devices 110 may be smart I/O peripherals.

The computer platform 100, in accordance with example implementations, includes one or multiple sensors 195, which are configured to detect physical tampering events. For example, in accordance with some implementations, a sensor 195 may be a switch sensor that has a mechanical lever operator element that contacts a protective cover of the computer platform 100. The switch sensor may have two states: a first state (e.g., an open, or off, state) responsive to the protective cover being installed; and a second state (e.g., a closed, or on, state) responsive to the protective cover being partially or wholly removed. The switch sensor may, for example, have one terminal that is coupled (e.g., coupled via a pullup resistor) to a secondary power supply line 150 and another terminal that provides a signal. Continuing this example, the mechanical lever operator element of the switch sensor may contact the protective cover so that when the protective cover is moved from its fully secured position, the corresponding movement of the mechanical lever operator element causes the signal of switch sensor to change states (e.g., change from a voltage level corresponding to a logic one level to a voltage level corresponding to a logic zero level).

An intrusion detection circuit 197 of the computer platform 100 may detect tampering in response to the signal that is provided by the switch sensor. For example, the intrusion detection circuit 197 may be an edge detection circuit that is coupled to a secondary power supply line 150. In response to an edge transition (e.g., a falling edge, or logic one to logic zero transition) in the signal that is provided by the switch sensor, the edge detection circuit provides an indication (e.g., changes an output signal of the intrusion detection circuit 197 to a predetermined logical state) of tampering event detection (called "tampering detection indication" or "tampering detection event indication" herein). In accordance with some implementations, the intrusion detection circuit 197 may latch or hold the tampering detection indication until cleared by another component (e.g., cleared by the UEFI 111 or a restore controller of the RTC device state back-up system) of the computer platform 100.

Although a single sensor 195 and a single intrusion detection circuit 197 are depicted in FIG. 1, in accordance with further implementations, the computer platform may have multiple sensors 195 and/or multiple instruction detection circuits 197. Moreover, a given sensor 195 may sense a tampering event other than the removal or attempted removal of a protective cover, and the corresponding intrusion detection circuit 197 may provide the corresponding tampering detection indication. For example, in accordance with some implementations, a given sensor 195 may sense removal of the computer platform 100 from an enclosure (e.g., a removal of a blade server or rack-mounted server from a rack or rack-mounted component). As another example, a given sensor 195 may sense disconnection of the computer platform 100 from a primary power source (e.g., sense the mechanical and/or electrical disconnection of the computer platform 100 from a backplane or other connection that supplies primary power). In accordance with some implementations, the computer platform 100 may have multiple sensors 195 and multiple intrusion detection circuits 197 that detect different types of tampering events.

The RTC device state back-up system 138, in accordance with example implementations, includes one or multiple latches 139. The latch 139 logs tampering event timestamps in the time domain of the ToB time 136 during primary power outages. More specifically, in accordance with example implementations, when a primary power outage occurs, the latch 139 is constructed to be triggered by a tampering event detection indication (provided by the intrusion detection circuit 197) to capture the current output of the ToB timer 136. This latched output of the ToB timer 136 is referred to as a "timestamp," or "first timestamp" herein and corresponds to the time domain of the ToB timer 136. When primary power is subsequently restored, the RTC device state back-up system 138, in accordance with example implementations, uses the most recent snapshot 140 for a given RTC device 180 to convert the timestamp captured by the latch 139 to a timestamp that is in the time domain of the RTC device 180.

In accordance with example implementations, when primary power is available, the computer platform 100 uses the current time (e.g., a current time-of-day and calendar date) that is provided by an RTC device 180 as a timestamp for a tampering event that is detected during primary power availability, instead of using a timestamp that is derived from a ToB.

Figure 2:
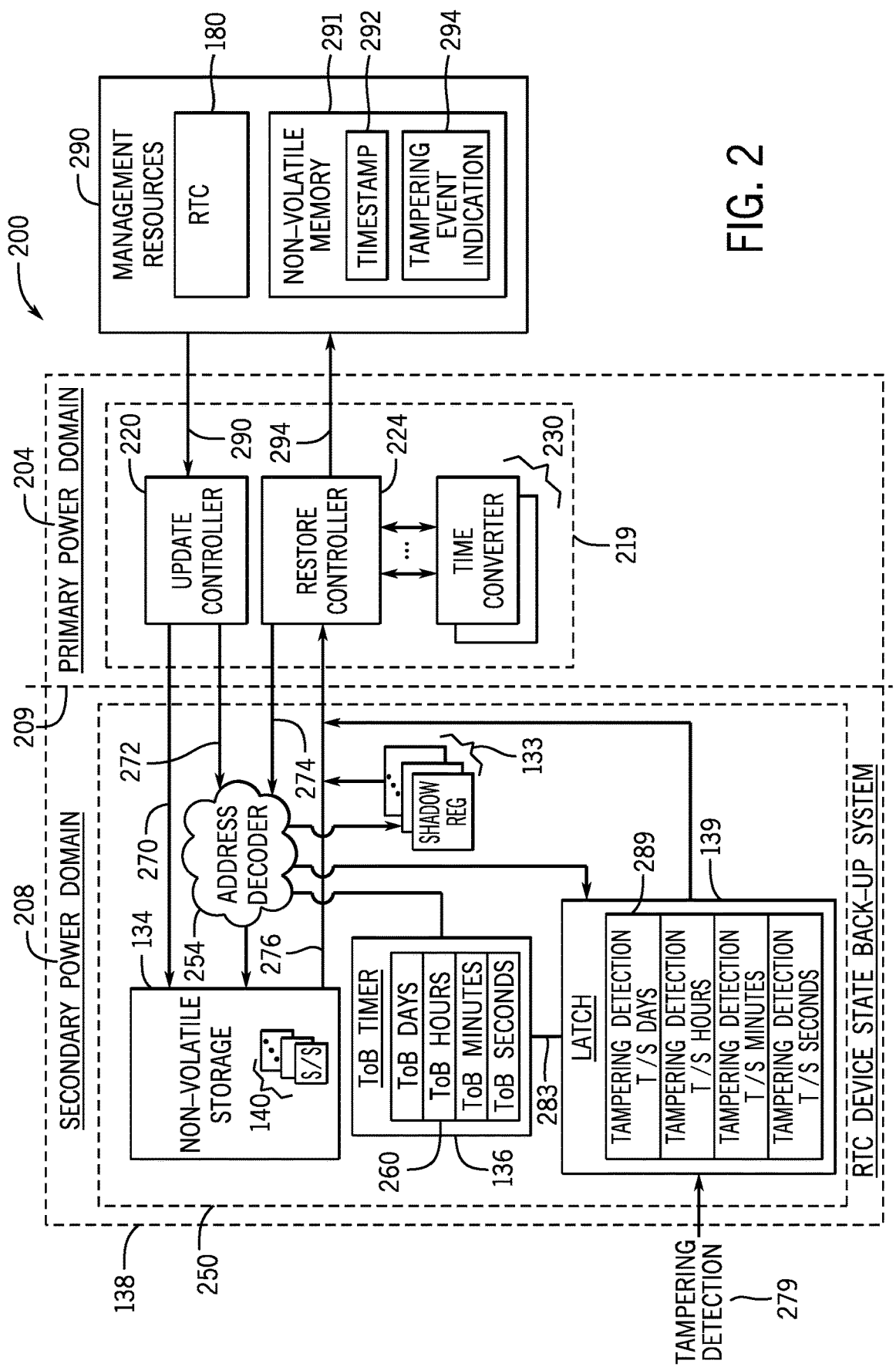
FIG. 2 is a block diagram of a system that includes an RTC device state back-up system and management resources according to an example implementation.

FIG. 2 is a block diagram of a system 200 that includes the RTC device state back-up system 138 and management resources 290 of the computer platform 100, in accordance with example implementations. In accordance with some implementations, the system 200 may be a subsystem of the computer platform 100 of FIG. 1. Referring to FIG. 2, in accordance with example implementations, the management resources 290 may include an RTC device 180 and a memory 291 that may store log records representing events of a computer platform. The RTC device 180 may provide RTC device time indications (e.g., indications representing time-of-day and a calendar date). It is noted that although a single RTC device 180 is depicted in FIG. 2, in accordance with further implementations, the system 200 may include multiple RTC device 180. For the example implementation that is depicted in FIG. 2, the memory 291 stores data representing a timestamp 292 and data representing a tampering event indication 294. Collectively, the timestamp 292 and the tampering event indication 294 may form at least part of a log entry corresponding to a tampering event.

The tampering event indication 294, in accordance with some implementations, may describe a particular type of tampering event detected by a sensor and intrusion detection circuit of the computer platform. The timestamp 292 may represent, in the time domain of the RTC device, a time-of-day and a calendar date corresponding to the time when a corresponding tampering event was detected. The memory 291 may contain data representing various other tampering and possibly non-tampering-related events occurring with the computer platform, in accordance with example implementations. For the particular example described herein, the tampering event represented by the timestamp 292 and tampering event indication 294 occurred while primary power was unavailable, and the timestamp 292 has its origin with a timestamp 289 that was captured by the latch 139, as further described herein.

In accordance with example implementations, system firmware of the computer platform may, upon power up, read logging records, such as a record that contains the timestamp 292 and tampering event indication 294, for purposes of taking the appropriate responsive actions (e.g., reporting the tampering event and/or performing or initiating one or multiple responsive or remedial actions to address the tampering event).

In accordance with example implementations, the latch 139 may be coupled (as depicted at reference numeral 283) to an output of the ToB timer 136. In accordance with example implementations, responsive to a tampering detection indication 279 (e.g., a tampering event detection provided by an intrusion detection circuit), the latch 139 latches a current output 260 of the ToB timer 136 to form a corresponding timestamp 289 that is stored, or logged, by the latch 139. As depicted in FIG. 2, the output 260 of the ToB timer 136 may, in accordance with example implementations, be partitioned into days, hours, minutes and seconds. Moreover, the timestamp 289 captured by the latch 139 may also be partitioned into days, hours, minutes and seconds, which represents, in the time domain of the ToB timer 136, a time that the corresponding tampering event was detected.

Regardless of the particular format of the time value provided by the ToB timer 136, the output value represents an accumulated duration of a particular power outage. As further described herein, in accordance with example implementations, the RTC device state back-up system 138, responsive to a primary power outage ending, may transform the timestamp 289 into the timestamp 292. This transformation includes adjusting the timestamp 289, which corresponds to a ToB time domain, so that the timestamp 292 is in a time domain of the RTC device 180.

In accordance with example implementations, the RTC device state back-up system 138 is partitioned (as depicted at 209) into two power domains: a primary power domain 204 and a secondary power domain 208. As such, some components 219 of the RTC device state back-up system 138 are located in the primary power domain 204 and receive power from a primary power source (and do not receive secondary power), and other components 250 of the RTC device state back-up system 138 are located in the secondary power domain and receive power from a secondary power source (and do not receive primary power).

In accordance with example implementations, the RTC device state back-up system 138 includes an update controller 220, which is located in the primary power domain 204. The update controller 220, in accordance with example implementations, is coupled to the RTC device 180 via a communication interface 290 (e.g., a communication interface provided via a Serial Peripheral Interface (SR) bus, an Inter-Integrated Circuit (I2C) bus, an Improved I2C (I3C) bus, or another bus or communication interface). The update controller 220, in accordance with example implementations, may be coupled to data and control signal lines 270 that are coupled to the non-volatile storage 134, and the update controller 220 may be coupled to address and control lines 272 that are coupled to an address decoder 254. The address decoder 254 and the non-volatile storage 134, as depicted in FIG. 2, may be located in the secondary power domain 208.

The update controller 220, in accordance with example implementations, is enabled when primary power is available, for purposes of maintaining snapshots 140 of the RTC devices 180 in the non-volatile storage 134. As part of maintaining the snapshots 140, the update controller 220 writes to locations in the non-volatile storage 134 corresponding to the different states that have changed from the previously stored states, and the update controller 220 repeatedly updates the data stored in the locations (e.g., repeatedly writes to the locations) so that when primary power is available, the snapshots 140 represent the current, or most recent, states of the RTC devices 180.

The update controller 220 may be informed when state changes occur in the RTC device states in one of many different ways, depending upon the particular implementation. For example, in accordance with some implementations, the update controller 220 may receive an interrupt that is provided by an RTC device 180 when a particular state of the RTC device 180 changes (e.g., a time-of-day indication changes, a calendar date indication changes, a write occurs to the volatile memory 214 of the RTC device, or another state change). The update controller 220 may, responsive to the interrupt, read data from the RTC device 180 corresponding to the interrupt and write data representing the read data to the location in the non-volatile storage 134, which corresponds to the appropriate snapshot 140.

As another example, in accordance with further implementations, the update controller 220 may poll certain storage locations (e.g., registers) of a particular RTC device 180 for purposes of determining when a corresponding state of the RTC device 180 changes. As another example, in accordance with further implementations, the update controller 220 may intercept updates (e.g., snoop write data) to certain storage locations (e.g., registers) of a particular RTC device 180 for purposes of determining when a corresponding state of the RTC device 180 changes.

As depicted in FIG. 2, in accordance with example implementations, the ToB timer 136 is associated with the secondary power domain 208, i.e., the ToB timer 136 receives power from a secondary power source. In accordance with example implementations, the ToB timer 136 counts to provide an accumulated time measured from the time when loss of primary power is detected. The accumulated time may be referenced to a reset count of the ToB timer 136, and the ToB timer 136 may, as further described herein, be reset in response to the primary power being restored.

The ToB timer 136, in accordance with example implementations, is enabled to begin counting in response to the beginning of a primary power outage. For example, in accordance with some implementations, the counting may be triggered by a power good signal, which transitions to a certain signal state to represent the beginning of a period of time in which the primary power is unstable or unavailable.

In accordance with example implementations, the output 260 of the ToB timer 136 represents the current time (called an "accumulated time" herein) that has elapsed from the time when the primary power outage began. It is noted that, in accordance with example implementations, the resetting of the ToB timer 136 may be controlled by a restore controller 224 of the RTC device state back-up system 138. As such, the ToB timer 136 may continue counting (e.g., the accumulated time may continue to increase) when primary power is available, which may be beneficial in the state restoration process, as further described herein.

In accordance with example implementations, the restore controller 224 resides in the primary power domain 204, and, responsive to the primary power being restored after a primary power outage, the restore controller 224 takes actions to restore the state(s) of RTC device(s) 180 of the computer platform. Moreover, when tampering is detected during the primary power outage, the restore controller 224 performs actions to transform the timestamp 289 from the ToB time domain to a time domain associated with the RTC device 180 for purposes of providing the timestamp 292. In accordance with some implementations, responsive to a primary power outage ending (e.g., responsive to a primary power good signal transitioning to a state representing that stable primary power is available), the restore controller 224 reads snapshot(s) 140 corresponding to the last stored time indication (e.g., an indication of a time-of-day and calendar date) for each respective RTC device 180.

The restore controller 224 adjusts the snapshot-provided time indications (which may involve adjusting the calendar date) based on the accumulated time that is provided by the ToB timer 136. The restore controller 224, in accordance with example implementations, may use one or multiple time converters 230 in the state restoration process to accommodate the time formats used by the RTC device(s) 180, as further described herein. Moreover, in accordance with example implementations, when tampering is detected during a primary power outage, the restore controller 224 may convert a timestamp 289 (representing a time of tampering detection) to timestamp(s) 292 associated with the time domain(s) of the RTC device(s) 180 of the management resources 290.

After the restore controller 224 determines adjusted times-of-day and determines adjusted calendar dates, the restore controller 224 may then cause data to be written to the RTC device(s) 180 to restore the updated states of the RTC device(s) 180 and provide the timestamp 292, if tampering occurred. In performing this process, the restore controller 224 may use shadow registers 133. After the restore controller 224 determines the adjusted times, the restore controller 224 may then cause data to be written to the RTC device(s) 180 to restore the updated states of the RTC device(s) 180. Moreover, the restore controller 224 may write the timestamp 292 and tampering event indication 294 to each RTC device 180, if tampering occurred during the power outage. The restore controller 224 may read data from the non-volatile storage 134 representing snapshot(s) of non-time-based state(s) (e.g., content corresponding to snapshots of one or multiple RTC device volatile memories) and write the read data to the RTC device(s) 180 to restore the state(s).

In accordance with example implementations, the restore controller 224, in response to the updates to the RTC device(s) 180 being complete, resets the ToB timer 136 and releases a hold on the update controller 220 (e.g., releases a hold that keeps the update controller 220 in reset after a primary power is restored), which allows the update controller 220 to maintain the snapshot(s) 140.

As depicted in FIG. 2, in accordance with example implementations, the restore controller 224 may be coupled by a communication interface 294 (e.g., a communication interface provided by an SPI bus, I2C bus, I3C bus, another bus or another communication interface) to the RTC device(s) 180. The restore controller 224, in accordance with example implementations, may be coupled to data and control signal lines 276 that are coupled to the non-volatile storage 134 and address and control lines 274 that are coupled to the address decoder 254.

In accordance with example implementations, the restore controller 224 begins its RTC device state restoration process by sampling the current output of the ToB timer 136. More specifically, in accordance with some implementations, the sampling of the output of the ToB timer 136 involves reading and latching the current output 260 of the ToB timer 136. In this context, "latching" the output 260 refers to the restore controller 224 storing the read value as a fixed ToB (e.g., the output 260 is latched inside the restore controller 224). The ToB timer 136, in accordance with example implementations, may continue to count after being read by the restore controller 224, until the ToB timer 136 is reset by the restore controller 224. The continued counting by the ToB timer 136 may be advantageous if a more recent ToB is to be used, as further described herein.

In accordance with some implementations, the update controller 220 may include one or multiple processing cores (e.g., CPU cores) that execute machine-readable instructions (e.g., instructions that are stored in a memory of the update controller 220) for purposes of performing functions (e.g., writing data to non-volatile storage representing RTC device snapshots) of the update controller 220. In accordance with some implementations, the update controller 220 may contain hardware circuitry that does not execute machine-readable instructions and performs some or all of the functions of the update controller 220. For example, in accordance with some implementations, the update controller 220 may be or include an application specific integrated circuit (ASIC). In accordance with some implementations, the update controller 220 may be or include a programmable logic device, such as a field programmable gate array (FPGA) or a complex programmable logic device (CPLD).

In accordance with some implementations, the restore controller 224 may include one or multiple processing cores (e.g., CPU cores) that execute machine-readable instructions (e.g., instructions that are stored in a memory of the restore controller 224) for purposes of performing functions of the restore controller 224, such as calculating adjusted RTC times and dates, reading the ToB, writing to registers of RTC devices with updated times and dates, writing to volatile memories of RTC devices with previously-stored snapshots of the memory content, and transforming timestamps between time domains. In accordance with some implementations, the restore controller 224 may contain hardware circuitry that does not execute machine-readable instructions and performs some or all of the functions of the restore controller 224. For example, in accordance with some implementations, the restore controller 224 may be or include an ASIC. In accordance with some implementations, the restore controller 224 may be or include a programmable logic device, such as an FPGA or CPLD.

In accordance with some implementations, the time converter 230 may include one or multiple processing cores (e.g., CPU cores) that execute machine-readable instructions (e.g., instructions that are stored in a memory of the restore controller 224) for purposes of converting data representing a first time and associated with the first format into data representing a second time corresponding to a second format. In accordance with some implementations, the time converter 230 may contain hardware circuitry that does not execute machine-readable instructions and performs some or all of the functions of the time converter 230. For example, in accordance with some implementations, the time converter 230 may be or include an ASIC. In accordance with some implementations, the time converter 230 may be or include a programmable logic device, such as an FPGA or CPLD. In accordance with some implementations, the restore controller 224 may execute machine-readable instructions or may include dedicated hardware circuitry corresponding to the time converters 230 (i.e., the time converters 230 may be incorporated into the restore controller 224).

In accordance with example implementations, each shadow register 133 is used by the restore controller 224 as a mechanism to update the time and date portion of a snapshot 140, and the restore controller 224 updates the shadow registers 133 while the times and dates are being restored inside the respective RTC devices 180. The shadow registers 133 provide a parallel way to update the time and date portions of the snapshots 140 during the same clock in which the ToB timer 136 is reset. In accordance with example implementations, data is not copied from the shadow registers 133 to the RTC devices 180. Rather, the restore controller 224 writes to both memories of the RTC devices 180 and the shadow registers 133 as the restore controller 224 is performing the time and date conversions. When the time and date conversions are complete, the primary copies of the time and date data stored in the memories of the RTC devices 180 are the same as the shadow copies of the time and date data stored in the corresponding shadow registers 133. This allows a seamless transfer of all time and date data in parallel from the shadow registers 133 to the time and date portions of the snapshots 140, reset the ToB timer 136, and enablement of the update controller 220 for future updates.

Figure 3A:
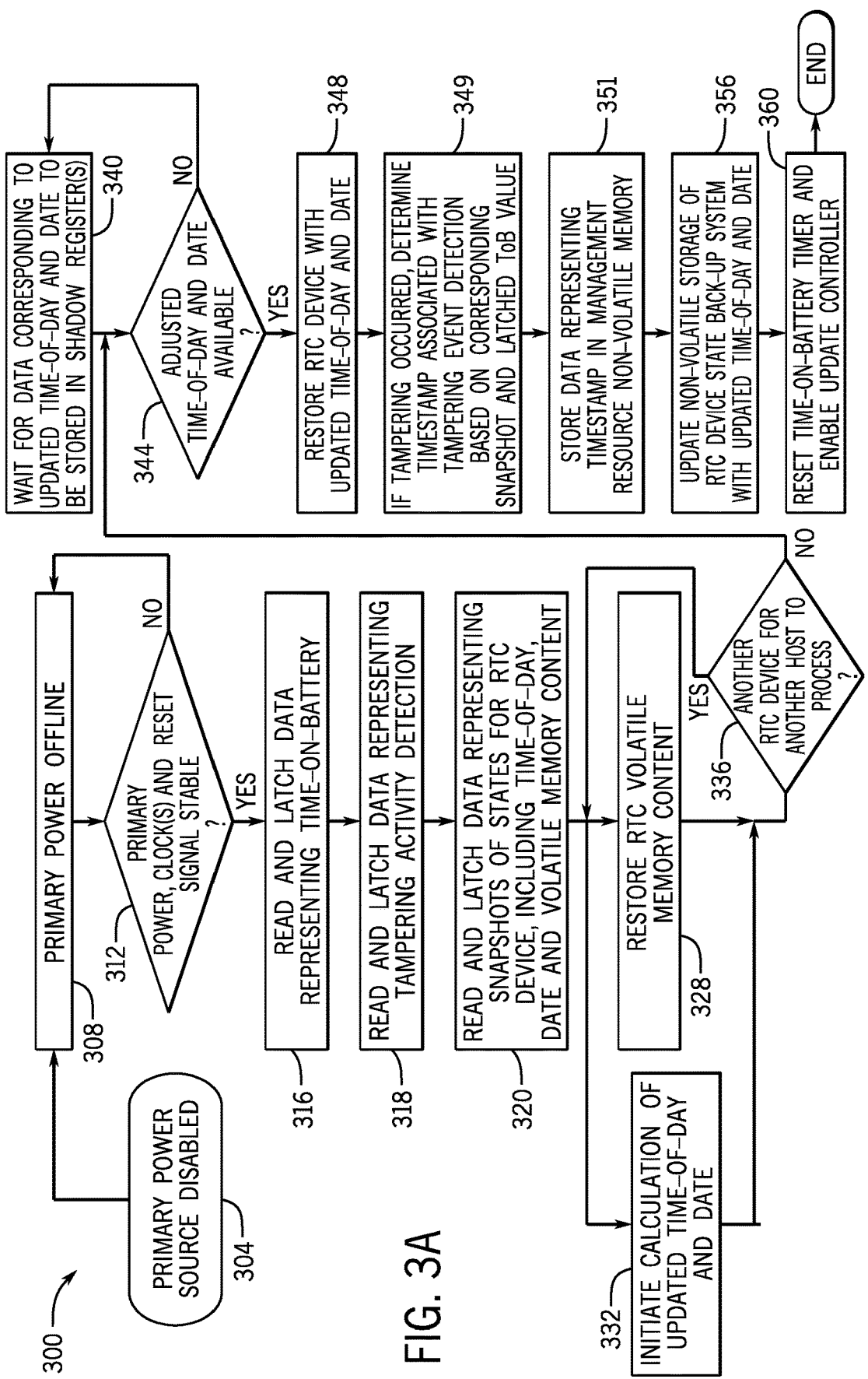
FIG. 3A is a flow diagram depicting a process to, responsive to primary power being available after a primary power outage, restore the state of an RTC device and transform a time-on-battery timestamp associated with a detected tampering event to a timestamp that corresponds to a time domain of the RTC device, according to an example implementation.

FIG. 3A depicts a process 300 that may be used to restore a state of an RTC device 180 and transform a timestamp logged during a primary power outage, in accordance with example implementations. In an example, the process 300 may be performed by a restore controller, such as the restore controller 224 of FIG. 2. Referring to FIG. 3A, the process 300 is initiated, in accordance with example implementations, in response to a primary power source for the computer platform being disabled, pursuant to block 304, such that the primary power is offline, pursuant to block 308.

The restore controller, in accordance with example implementations, receives primary power, and as such, the restore controller may remain powered down after a primary power outage until the primary power, clock(s), reset signal associated with the restore controller are once again stable, as depicted in decision block 312. When these criteria are met, the restore controller is released from reset and begins performing actions to restore the state(s) of the RTC device (s), beginning with block 316. In accordance with example implementations, an update controller, such as the update controller 220 of FIG. 2, which is powered by the primary power source, is held in reset while the restore controller is released from reset, and the update controller remains in reset until released by the restore controller, as described herein.

Although blocks 316-360 of FIG. 3A depict a sequential flow of actions, some or all of these actions may be performed in parallel and/or in a different order than the order that is depicted in FIG. 3A, in accordance with further implementations.

The process 300 includes, pursuant to block 316, reading and latching data representing the current ToB. Pursuant to block 318, the process 300 includes reading and latching data representing tampering activity detection. In an example, this data may describe a particular tampering event. In an example, the data may be provided by a particular sensor or sensor subsystem of the computer platform 100, which detected the tampering. In examples, the data or the source of the data may identify the type of detected tampering. Moreover, in accordance with example implementations, block 318 may include reading the content of a latch, such as the latch 139 of FIG. 2, wherein the content of the latch represents a timestamp. In an example, the timestamp may represent a time in the ToB time domain of the tampering event.

Pursuant to block 320, the process 300 includes reading and latching data that represents a snapshot of RTC states for a particular RTC instance. Pursuant to decision block 324 of process 300, if another RTC instance is to be processed, then control returns to block 320.

Figure 4:
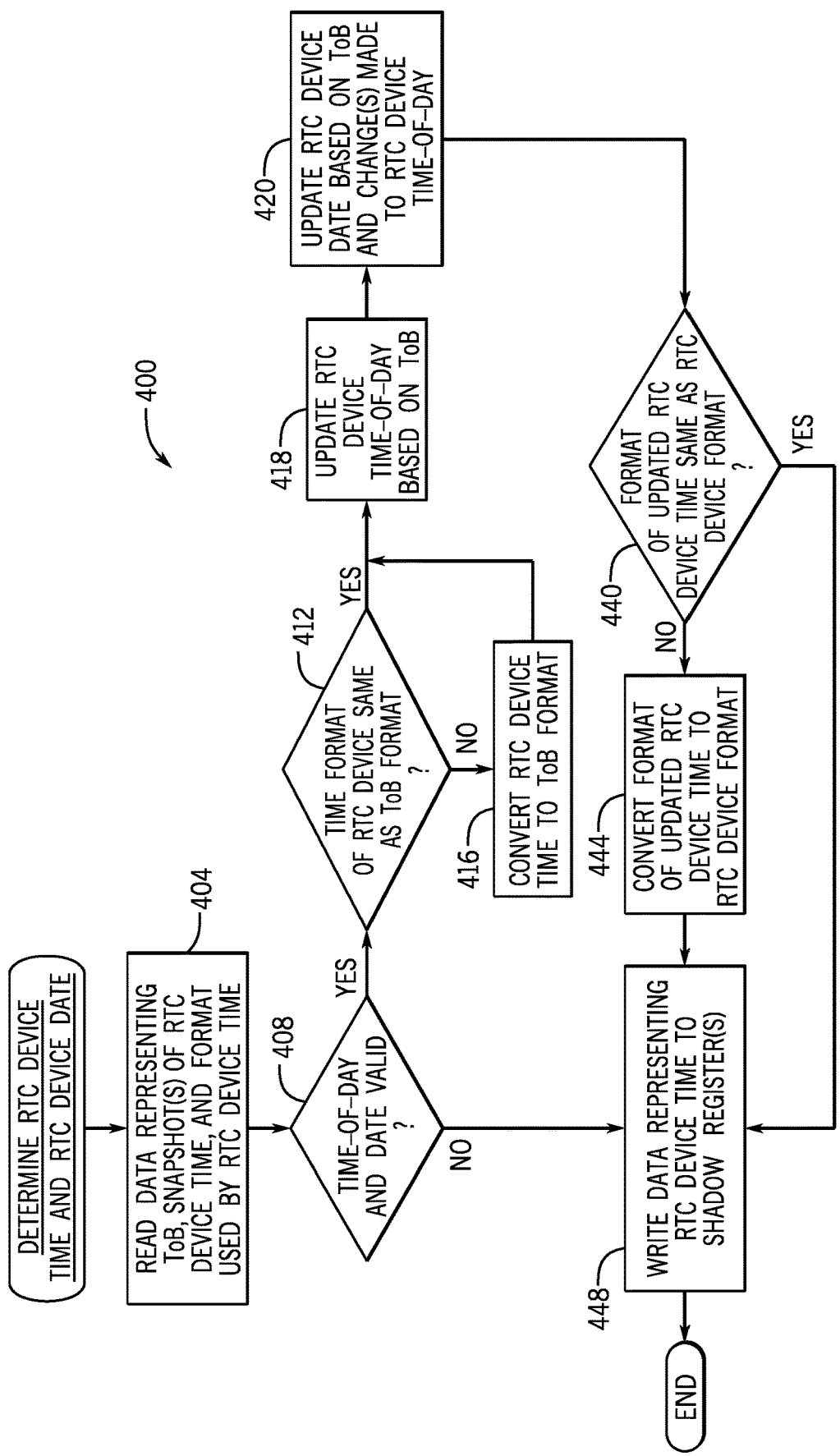
FIG. 4 is a flow diagram depicting a process to determine an updated time-of-day and an updated calendar date for an RTC device based on RTC device state snapshot data and a time-on-battery (ToB), according to an example implementation.

After the ToB data, snapshot data and tampering data are obtained, the process 300 includes initiating (block 332) the calculation of the updated time and date for the current RTC instance and restoring (block 328) the volatile memory content of the RTC device. As depicted in FIG. 3A, the process 300 may include performing blocks 328 and 332 in parallel. In accordance with example implementations, the calculation of the updated time and date may be performed in parallel with other actions of the process 300. FIG. 4, which is described below, depicts a specific example of a process 400 to calculate the updated time and date, in accordance with example implementations. Still referring to FIG. 3A, pursuant to block 328, the process 300 includes restoring the volatile memory content by writing the snapshot data corresponding to the content to the volatile memory of the RTC device. If, pursuant to decision block 336, another RTC device for another RTC instance is to be processed, then control returns to blocks 328 and 332.

In accordance with example implementations, for purposes of ensuring that the read snapshot data is not corrupted if a primary power loss occurs during the RTC state restoration, the process 300 writes data representing the calculated updated time and dates to shadow registers (e.g., shadow registers 133 depicted in FIGS. 1 and 2), which are in the secondary power domain.

The process 300 includes waiting (decision block 340 and block 344) for the updated time and date for each RTC instance to be written to the corresponding shadow registers. When this occurs, the process 300, begins updating, pursuant to block 348, the time and date portions of the RTC devices to complete the restoration of the RTC states. Pursuant to decision block 349, each RTC instance is processed until all states are restored.

Pursuant to block 350, if tampering occurred during the primary power outage, then the process 300 includes determining a timestamp that is associated with the tampering event detection based on the latched ToB value (e.g., the timestamp provided by the latch 139 of FIG. 2) that corresponds to the detected tampering event. Similar to the transformation of the free-running ToB value, in accordance with example implementations, the latched ToB value may be transformed into the time domain of the RTC that corresponds to a management entity (e.g., the BMC 129 of FIG. 1) of the computer platform 100 using the original RTC snapshot time and date corresponding to the detected power outage. In accordance with example implementations, determining the timestamp per block 250 includes perform a time conversion by calculating the tamper time based on the RTC snapshot data corresponding to the management entity and the latched tampering event timestamp. After the time conversion is performed, then, pursuant to block 351, data representing the transformed timestamp is transferred to a non-volatile management resource memory (e.g., memory 291 of FIG. 2).

In some example implementations, the management entity (e.g., the BMC 129 of FIG. 1) may receive a tampering indication and a transformed timestamp from a restore controller (e.g., the restore controller 224 of FIG. 2), and the management entity may report the tampering indication and the transformed timestamp. In an example, the management entity may report the tampering indication and the transformed timestamp to a management server or other administrative interface. In accordance with some implementations, a tampering indication and a transformed timestamp may be made available to other or additional entities, such as one or multiple hosts 101 (FIG. 1) of the computer platform 100, which serve as reporting entities. Consequently, in accordance with example implementations, the latched tampering timestamp value may be converted to the respective time domain of each reporting entity using the RTC snapshot data corresponding to RTC instance. The transformed timestamp corresponding to the reporting entity may be made available through additional registers in the RTC (e.g., the RTC 180 of FIG. 2).

The process 300 next includes, in accordance with example implementations, updating the non-volatile storage of the RTC device back-up system with the updated time and date states, pursuant to block 356. In this manner, the process 300 includes updating the snapshots in the non-volatile storage representing the now current RTC times and dates using the shadow registers (e.g., the shadow registers 133 of FIG. 2) that were updated in block 340. The shadow registers provide a parallel way to update the time and date portions of the snapshots during the same clock in which the ToB timer (e.g., the ToB timer 136 of FIG. 2) is reset, which prevents data loss in the event of an additional power outage. Pursuant to block 360, the process 300 includes resetting the ToB timer and enabling the update controller, so that the update controller may begin maintaining the snapshots.

Figure 3B:
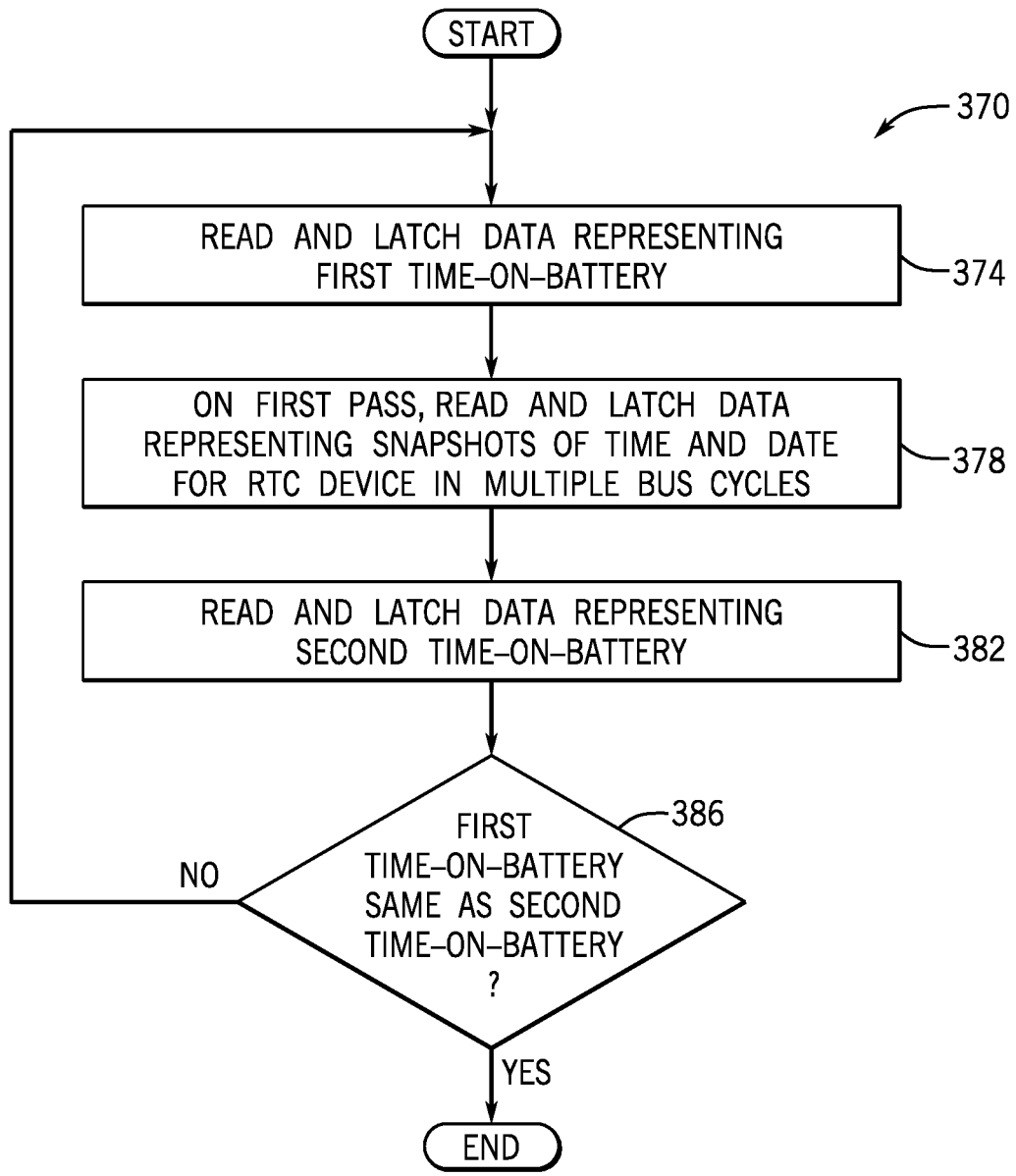
FIG. 3B is a flow diagram depicting a process to read RTC device state snapshot data using multiple bus cycles according to an example implementation.

Referring to FIG. 3B, pursuant to block 374, the process 370 includes reading and latching data representing a first ToB. Next, the process 370 includes reading and latching data representing the snapshots of the time and date for the RTC device in multiple bus cycles, pursuant to block 378. The process 370 next includes reading (block 382) and latching data representing a second ToB. If, pursuant to decision block 386, the first ToB and second ToB are not the same, then control returns to block 374 to perform another iteration of reading the ToB and snapshot data. Otherwise, the ToB time has not changed, and all of the read snapshot data is associated with the same ToB.

In accordance with example implementations, the ToB timer keeps running and may increment while the data that represents the ToB is read from the ToB timer in multiple consecutive reads using multiple bus cycles (i.e., a part of the ToB is read in each bus cycle). It is possible that the ToB timer may update the ToB between consecutive reads. This means that a particular ToB value that is derived using multiple reads of the ToB timer may have one of three states: invalid, stale or valid. In an example, multiple reads of the ToB timer may result in a ToB value that is "torn" and therefore invalid. For example, if the ToB value is read in two consecutive reads, the first read may correspond to the seconds portion of the ToB, and the second read may correspond to the minutes portion of the ToB. The ToB at the time of the first read may be 1 minute and 59 seconds. If the ToB increments by one second between the first and second reads, then the ToB value constructed from both reads is 2 minutes and 59 seconds, which is invalid. In another example, multiple reads of the ToB timer may results in a stale ToB value. For example, the ToB at the time of the first read may be 1 minute and 32 seconds, the ToB at the time of the second read may be 1 minute and 33 seconds and two consecutive reads may be used to derive the ToB value. The first read may retrieve a ToB second value of 32 seconds, and the second read may retrieve a ToB minute value of 1 minute. Therefore, for this example, the ToB value derived by the two reads is 1 minute and 32 seconds, although the ToB at the time of the second read was actually 1 minute and 33 seconds.

For purposes of ensuring that a ToB value that is derived using multiple consecutive reads of the ToB timer is valid (e.g., not torn or stale), the restore controller rereads the ToB time (each via multiple consecutive reads) until the last two ToB values are the same. More specifically, in accordance with example implementations, the restore controller may perform a process 370 that is depicted in FIG. 3B for purposes of reading the ToB timer.

Referring to FIG. 3B, pursuant to block 374, the process 370 includes reading and latching data representing a first ToB. Next, the process 370 may include reading and latching data representing the snapshots of the time and date for the RTC device in multiple bus cycles, pursuant to block 378. Although the ToB timer is incrementing and therefore, the ToB is dynamic in nature, the snapshot data is static, and as such, the process 370 includes performing block 378 in the first pass (of potentially multiple passes but) not performing the block 378 in any subsequent pass that is used to derive a valid ToB value. The process 370 next includes reading (block 382) and latching data representing a second ToB. If, pursuant to decision block 386, the first ToB and second ToB are not the same, then another iteration of the process 370 is used to read two ToB values, pursuant to blocks 374 and 382. If, pursuant to block 386, the two ToB values are the same, then the ToB value is considered valid and the process 370 terminates.

FIG. 4 depicts a process that may be performed by the restore controller 224 to calculate, or determine, an updated time-of-day and date for a given RTC device, in accordance with example implementations. The process 400 may be initiated in block 332 of FIG. 3A, in accordance with example implementations.

Referring to FIG. 4, pursuant to block 404, the process 400 includes reading data representing the ToB, the snapshots of the time and date, and the time format used by the RTC device. FIG. 4 depicts the processing of an RTC device time, beginning an RTC time and date represented by snapshot(s) and ending with a calculated RTC device time and final RTC device date, called the "updated RTC device time" and "updated RTC device date," respectively. Pursuant to decision block 408, a determination is made whether the snapshot is valid. In this manner, in accordance with some implementations, a particular host 101 may update the RTC device with a time and date after a power outage, and as such, the RTC device time and date stored by the corresponding snapshot(s) are invalid and are not updated by the process 400.

If the RTC device time and RTC device date derived from the snapshot(s) are valid, then, pursuant to decision block 412, the process 400 includes determining whether the time format used by the RTC device is same as the ToB format. If not, the process 400 includes converting (block 416) the RTC device time from the RTC device format to the ToB format. Next, the process 400 includes updating (block 418) the RTC device time-of-day based on the ToB and updating (block 420) the RTC device calendar date (e.g., a day of the week, a day of the month and year) based on the ToB and change(s) made to the RTC device time-of-day.

As an example, the ToB may be 35 seconds, and the snapshot calendar date and time-of-day may be the following: Thursday, Jun. 24, 2004, 08:45:42, in a 24 hour (hour: minute:second) format. The corresponding adjusted RTC device calendar date and time-of-day for this example is Thursday, Jun. 24, 2004, 8:46:17. As another example, the ToB may be 58 seconds, and the snapshot calendar date and time-of-day may be the following: Friday, Dec. 31, 1999, 23:59:56. The corresponding adjusted RTC calendar date and time-of-day for this example is Saturday, Jan. 1, 2000, 00:00:54.

Next, pursuant to decision block 440, the process 400 includes determining whether the format of the updated RTC time is the same as the format of the RTC device, and if not, the process 400 includes converting (block 444) the format of the updated RTC device time to the format of the RTC device. The process 400 includes, pursuant to block 448, writing data to the appropriate shadow register(s) representing the updated RTC device time and updated RTC device date.

Figure 5:
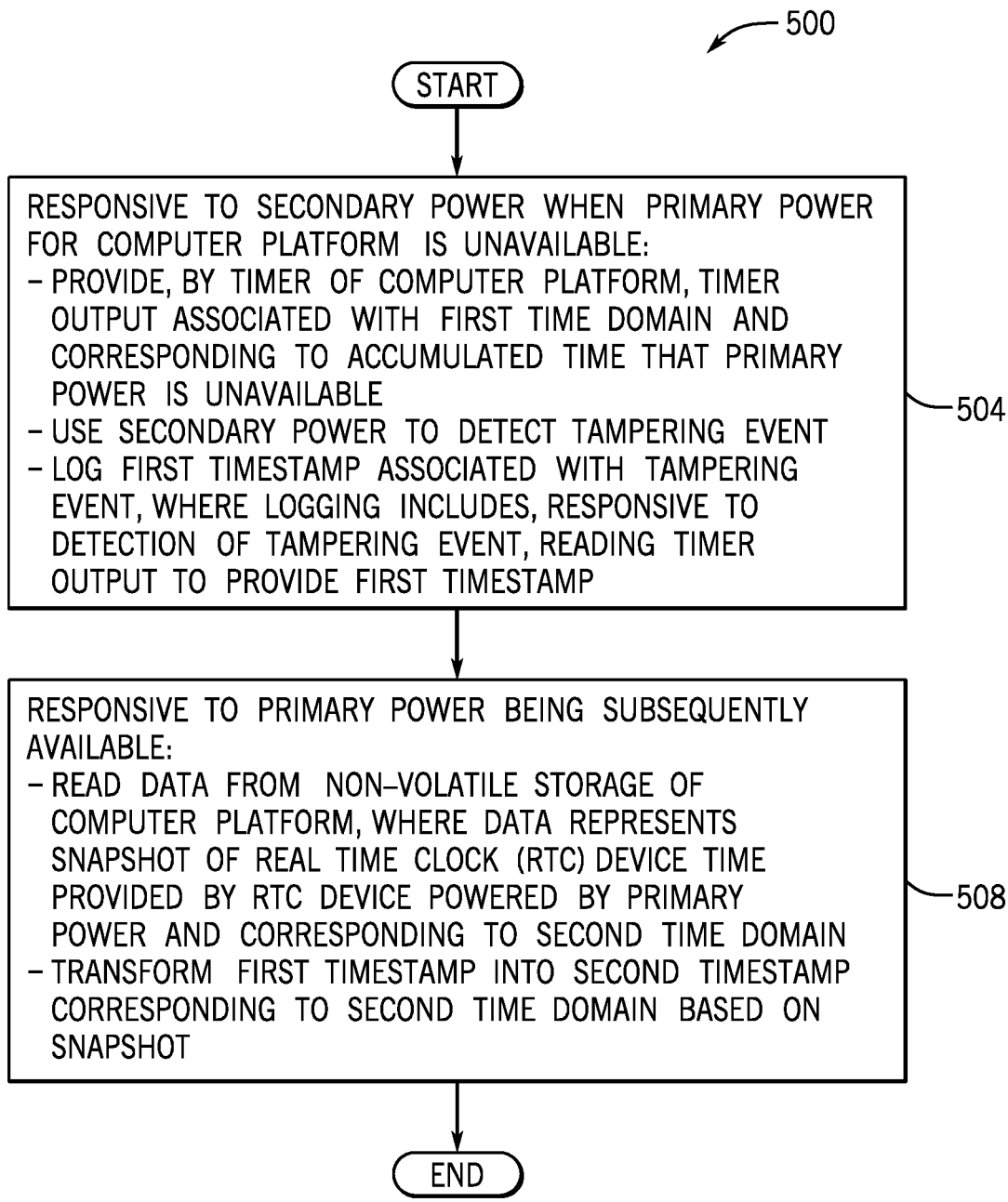
FIG. 5 is a flow diagram depicting a process to, responsive to secondary power when primary power is unavailable, log a timestamp that is associated with a tampering event and responsive to the primary power being subsequently available, transform the timestamp to a timestamp that corresponds to a time domain of an RTC device, according to an example implementation.

Referring to FIG. 5, in accordance with example implementations, a process 500 includes performing actions, pursuant to block 504, responsive to secondary power when primary power for a computer platform is unavailable. The actions include providing, by a timer of a computer platform, a timer output that is associated with a first time domain and corresponds to an accumulated time that primary power is unavailable. Moreover, these actions include using secondary power to detect tampering with the computer platform, and responsive to detecting the tampering, reading the timer output to provide a first timestamp that represents a time of detection of the tampering. In accordance with example implementations, the RTC device may be a hardware RTC device, which is part of a management controller (e.g., a baseboard management controller) of the computer platform. In accordance with example implementations, the RTC device may provide a time-of-day and calendar date corresponding to the rotational cycles of the Earth.

In accordance with some implementations, the timer may be part of a secondary power domain. The time may be reset responsive to the primary power source being enabled. The timer may begin counting responsive to the beginning of a primary power outage.

The process 500 further includes actions, as depicted in block 508, which are performed responsive to primary power being subsequently available. These actions include reading data from a non-volatile storage of the computer platform. The data represents a snapshot of a real time clock (RTC) device time, which is provided by an RTC device. The RTC device is powered by the primary power and corresponds to a second time domain. The actions further include transforming the first timestamp into the second timestamp based on the snapshot.

In accordance with some implementations, the second timestamp may represent a time-of-day and a calendar date.

In an example, the non-volatile storage may include volatile memory devices that are powered by the secondary power. In another example, the non-volatile storage may include non-volatile memory devices (e.g., flash memory devices, ROM devices, phase change memory devices, memristor memory devices, or memory devices corresponding to another non-volatile memory device technology). In accordance with some implementations, the tampering event may be a physical tampering event. In accordance with some implementations, the tampering event may be associated with a removal or attempted removal of a protective cover of the computer platform or removal of the computer platform from an electrical and/or mechanical connection.

Figure 6:
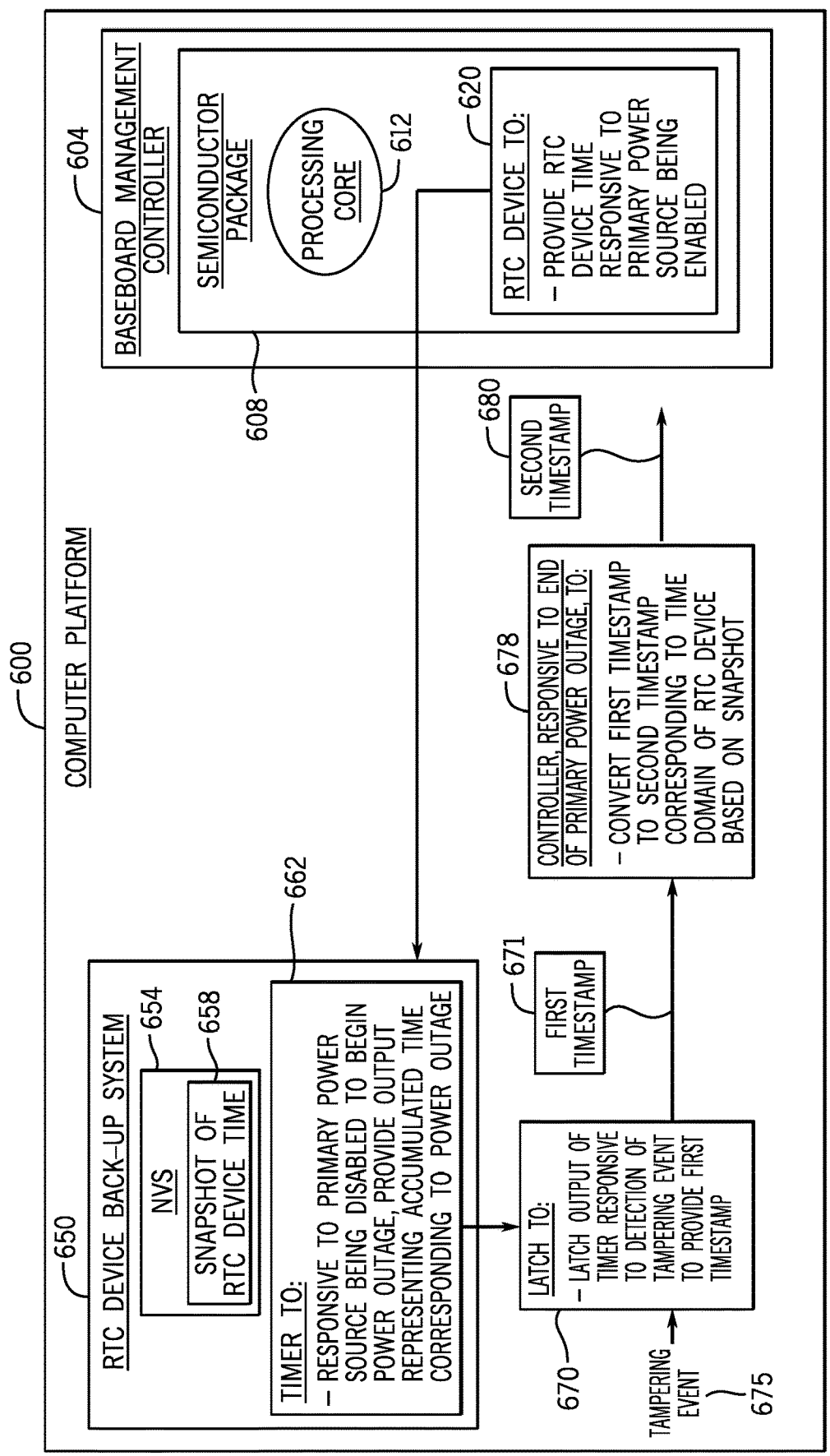
FIG. 6 is a block diagram of a computer platform that includes a latch to log a first timestamp representing a time of a tampering event and a controller to, responsive to an end of a primary power outage, convert the first timestamp to a second timestamp that is associated with a time domain of an RTC device of the computer platform, according to an example implementation.

Referring to FIG. 6, in accordance with example implementations, a computer platform 600 includes a baseboard management controller; a real time clock (RTC) device back-up system 650; a latch 670; and a controller 678. The baseboard management controller 604 includes a semiconductor package 608. The semiconductor package 608 includes a processing core 612 and an RTC device 620. The RTC device provides an RTC device time responsive to a primary power source being enabled. The RTC device 620 may provide a time-of-day and a calendar date corresponding to the rotational cycles of the Earth.

The processing core 612 provides management services for a host of the computer platform 600. The management services may, as examples, include monitoring sensors; monitoring operating system status; monitoring power statuses; logging computer system events; providing a remote console; providing remotely-controlled functions and other virtual presence technologies; and other management activities. In accordance with some implementations, the computer platform 600 may provide multiple hosts, with each host corresponding to a logical instance of the computer platform 600. The time and date from the RTC device 620 may be continuously copied to the snapshot 658 when primary power is available, and accordingly the snapshot 658 provides the last time and date when the primary power was available. The RTC device back-up system 650 includes a non-volatile storage 654; and a timer 662. The non-volatile storage 654 stores a snapshot 658 of the RTC device time responsive to the primary power source being enabled.

The timer 662, responsive to the primary power source being disabled, provides an output that represents an accumulated time that corresponds to the power outage. In accordance with example implementations, the timer may be a counter. The latch 670 logs a first timestamp 671 that represents a time of a detected tampering event 675, and the latch samples the output of the timer 662 responsive to detection of the tampering event to provide the first timestamp 671.

The controller 678, responsive to an end of the primary power outage and based on the snapshot, converts the first timestamp 671 to a second timestamp 680 corresponding to a time domain of the RTC device. The controller 678 may, in accordance with example implementations, store data that represents the second timestamp 680. For example, in accordance with some implementations, the controller 678 may store data representing the second timestamp 680 in a management resource memory of the computer platform 600.

Figure 7:
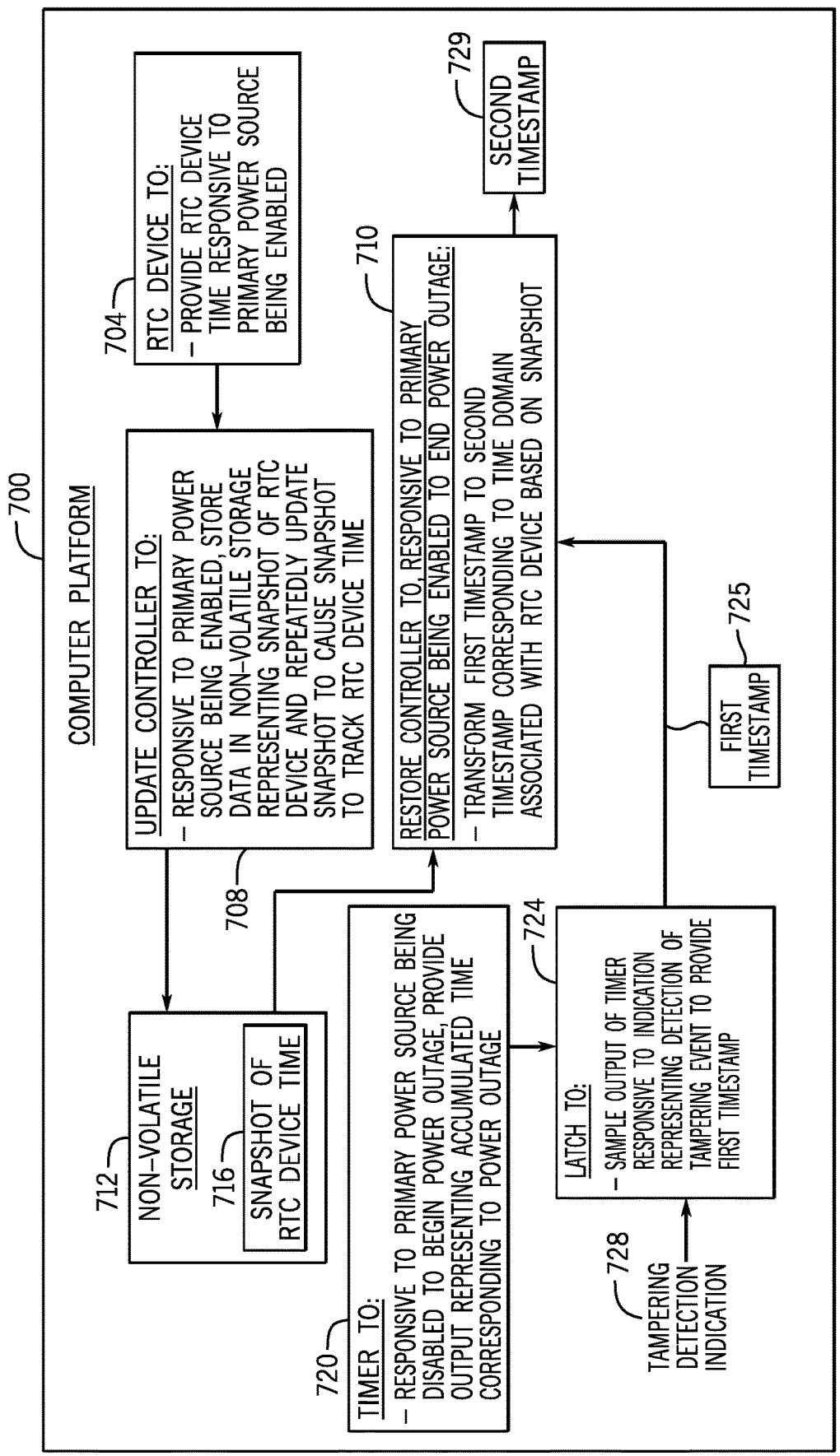
FIG. 7 is a block diagram of a computer platform that includes a latch to log a first timestamp representing a time of tampering event and a restore controller to, responsive to a primary power source being enabled, transform the first timestamp to a second timestamp that corresponds to a time domain of an RTC device of the computer platform, according to an example implementation.

Referring to FIG. 7, in accordance with example implementations, a computer platform 700 includes a real time clock (RTC) device 704; a non-volatile storage 712; and an update controller 708; a timer 720; a latch 724; and a restore controller 710. In accordance with example implementations, the update controller 708 and the restore controller 710 may be part of a primary power domain, and the timer 720 and latch 724 may be part of a secondary power domain. In accordance with some implementations, the RTC device 704 may be associated with management resources of the computer platform 700. The RTC device 704 to provide an RTC device time responsive to a primary power source being enabled. In accordance with some implementations, the RTC device 704 may be part of a management controller of the computer platform, such as a baseboard management controller. In accordance with example implementations, the RTC device 704 may provide a time-of-day and calendar date corresponding to the rotational cycles of the Earth. In accordance with example implementations, the timer 720 may be a counter.

The update controller 708, responsive to the primary power source being enabled, stores data in the non-volatile storage 712 representing a snapshot 716 of the RTC device time and repeatedly updates the snapshot 716 to cause the snapshot 716 to track the first time. The timer 720, responsive to the primary power source being disabled, provides an output that represents an accumulated time that corresponds to the power outage. The latch 724 logs a first timestamp 725 that represents a time of a tampering event 728. The latch 724 samples the output of the timer 720 responsive to an indication that represents detection of the tampering event to provide the first timestamp 725. The restore controller 710, responsive to the primary power source being enabled to end the power outage and based on the snapshot, transforms the first timestamp 725 to a second timestamp 729 that corresponds to a time domain that is associated with the RTC device 704. In accordance with example implementations, the restore controller 710 may control when the update controller 708 is released from reset responsive to the primary power source being enabled. In accordance with example implementations, the restore controller 710 may store data representing the second timestamp 729 in a resource management memory of the computer platform 700 and control the resetting of the timer 720.

In accordance with example implementations, using the secondary power to detect the tampering event includes detecting activity corresponding to at least one of an enclosure associated with the computer platform being opened, a removal of the computer platform from a backplane connection or an opening of a cover for the computer platform. A particular advantage is that tampering events may be logged when primary power is not available in a cost effective and power efficient manner.

In accordance with example implementations, the process includes, responsive to the primary power being subsequently available, storing data in a memory of the computer platform representing the second timestamp and an associated indication of the tampering. A particular advantage is that tampering events may be logged when primary power is not available in a cost effective and power efficient manner.

In accordance with example implementations, the process further includes, responsive to the primary power being subsequently available, reading, by system firmware, the data representing the second timestamp and the indication of tampering, and initiating, by the system firmware, a responsive action to the detection of the tampering event. A particular advantage is that tampering events may be logged when primary power is not available in a cost effective and power efficient manner.

In accordance with example implementations, the RTC device updates the RTC device time responsive to the primary power being available. The process further includes, responsive to the primary power being available prior to the primary power being unavailable, repeatedly updating the snapshot to track the updating of the RTC device time by the RTC device. A particular advantage is that tampering events may be logged when primary power is not available in a cost effective and power efficient manner.

In accordance with example implementations, the process further includes, responsive to the primary power being subsequently available, determining an adjusted RTC device time based on the snapshot and an output value that is provided by the timer; and writing data representing the adjusted RTC device time to the RTC device to restore the RTC device. A particular advantage is that tampering events may be logged when primary power is not available in a cost effective and power efficient manner.

In accordance with example implementations, the process incudes, responsive to an indication of the tampering event, latching the timer output to provide the first timestamp. A particular advantage is that tampering events may be logged when primary power is not available in a cost effective and power efficient manner.

In accordance with example implementations, the transformation of the first timestamp further includes transforming the first timestamp from a first time format associated with the timer to a second time format associated with the RTC device. A particular advantage is that tampering events may be logged when primary power is not available in a cost effective and power efficient manner.

In accordance with example implementations, the first timestamp represents a time of the tampering event referenced from a time when the primary power became unavailable. A particular advantage is that tampering events may be logged when primary power is not available in a cost effective and power efficient manner.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. A method comprising:
   responsive to a secondary power when a primary power for a computer platform is unavailable:
   providing, by a timer of the computer platform, a timer output associated with a first time domain and corresponding to an accumulated time that the primary power is unavailable;
   using the secondary power to power an intrusion detection circuit to detect a tampering event using a sensor; and
   logging a first timestamp associated with a tampering event, wherein the logging comprises, responsive to the detection of the tampering event, reading the timer output to provide the first timestamp; and
   responsive to the primary power being subsequently available:
   reading data from a non-volatile storage of the computer platform, wherein the data represents a snapshot of a real time clock (RTC) device time provided by an RTC device powered by the primary power and corresponding to a second time domain; and
   transforming the first timestamp into a second timestamp that corresponds to the second time domain based on the snapshot.

2. The method of claim 1, wherein using the secondary power to detect the tampering event comprises at least one of detecting activity corresponding to an enclosure associated with the computer platform being opened, a removal of the computer platform from a backplane connection or an opening of a cover for the computer platform.

3. The method of claim 1, further comprising:
   responsive to the primary power being subsequently available, storing data in a memory of the computer platform representing the second timestamp and an associated indication of the tampering.

4. The method of claim 3, further comprising:
   responsive to the primary power being subsequently available, reading, by system firmware, the data representing the second timestamp and the indication of tampering, and initiating, by the system firmware, a responsive action to the detection of the tampering event.

5. The method of claim 1, wherein the RTC device updates the RTC device time responsive to the primary power being available, the method further comprising:
   responsive to the primary power being available prior to the primary power being unavailable, repeatedly updating the snapshot to track the updating of the RTC device time by the RTC device.

6. The method of claim 1, further comprising, responsive to the primary power being subsequently available:
   determining an adjusted RTC device time for the RTC device based on the snapshot and an output value provided by the timer; and
   writing data representing the adjusted RTC device time to the RTC device to restore the RTC device.

7. The method of claim 1, further comprising, responsive to an indication of the tampering event, latching the timer output to provide the first timestamp.

8. The method of claim 1, wherein the transforming further comprises transforming the first timestamp from a first time format associated with the timer to a second time format associated with the RTC device.

9. The method of claim 1, wherein the first timestamp represents a time corresponding to detection of the tampering event referenced from a time when the primary power became unavailable.

10. A computer platform comprising:
    a baseboard management controller comprising a semiconductor package, wherein the semiconductor package comprises:
    a processing core to provide management services for a host of the computer platform; and
    a real time clock (RTC) device to provide an RTC device time responsive to a primary power source being enabled; and
    an RTC device back-up system comprising:
    a non-volatile storage to store data representing a snapshot of the RTC device time responsive to the primary power source being enabled; and
    a timer to, responsive to the primary power source being disabled to begin a power outage, provide an output representing an accumulated time corresponding to the power outage;
    a latch to latch the output of the timer responsive to a detection of a tampering event using a sensor to provide a first timestamp; and
    a first controller to, responsive to an end of the primary power outage and based on the snapshot, convert the first timestamp to a second timestamp corresponding to a time domain of the RTC device.

11. The computer platform of claim 10, further comprising:
a second controller to, responsive to the primary power source being enabled, to repeatedly update the snapshot to cause the snapshot to track the RTC device time.

12. The computer platform of claim 11, wherein the first controller to further:
determine an adjusted time for the RTC device based on the snapshot and the output of the timer;
update the snapshot responsive to the first controller determining the adjusted time for the RTC device; and
release a hold on a reset of the second controller responsive to updating the data representing the snapshot.

13. The computer platform of claim 10, wherein the first controller to further:
determine an adjusted RTC device time for the RTC device based on the snapshot and the output of the timer.

14. The computer platform of claim 10, wherein the timer and the latch are powered by a secondary power source, the computer platform further comprising:
a shadow register powered by the secondary power, wherein the first controller to write the third data to the shadow register; and
initiate a transfer of the third data from the shadow register to another memory of the computer platform.

15. A computer platform comprising:
a real time clock (RTC) device to provide an RTC device time responsive to a primary power source being enabled;
a non-volatile storage;
an update controller to, responsive to the primary power source being enabled, store data in the non-volatile storage representing a snapshot of the RTC device time and repeatedly update the snapshot to cause the snapshot to track the RTC device time;
a timer to, responsive to the primary power source being disabled to begin a power outage, provide an output representing an accumulated time corresponding to the power outage;
a latch to sample the output of the timer responsive to an indication representing detection of a tampering event using a sensor to provide a first timestamp; and
a restore controller to, responsive to the primary power source being enabled to end the power outage and based on the snapshot, transform the first timestamp to a second timestamp corresponding to a time domain associated with the RTC device.

16. The computer platform of claim 15, wherein the tampering event comprises an enclosure intrusion, the computer platform further comprising:
the sensor comprising a switch coupled to a secondary power source to sense the enclosure intrusion; and
an intrusion detector coupled to the switch to provide an indication representing detection of the enclosure intrusion.

17. The computer platform of claim 16, wherein the enclosure intrusion comprises at least one of an opening of a cover for the computer platform, opening an enclosure associated with the computer platform, or removing the computer platform from an electromechanical connection.

18. The computer platform of claim 15, further comprising a management resource memory, wherein the restore controller to further store data representing the second timestamp and data describing the tampering event in the management resource memory.

19. The computer platform of claim 15, wherein the first timestamp represents a time corresponding to detection of the tampering event referenced from a time when the primary power became unavailable.

20. The computer platform of claim 15, further comprising a baseboard management controller, wherein the baseboard management controller comprises a semiconductor package comprising a processing core to provide a management service for the computer platform, and the semiconductor package includes the RTC device.

* * * * *